No. 671,274. Patented Apr. 2, 1901.
W. C. FISCHER.
LOCKING DEVICE FOR PARTS OF MACHINERY.
(Application filed Oct. 19, 1900.)
(No Model.) 2 Sheets—Sheet 1.

No. 671,274. Patented Apr. 2, 1901.
W. C. FISCHER.
LOCKING DEVICE FOR PARTS OF MACHINERY.
(Application filed Oct. 19, 1900.)
(No Model.) 2 Sheets—Sheet 2.
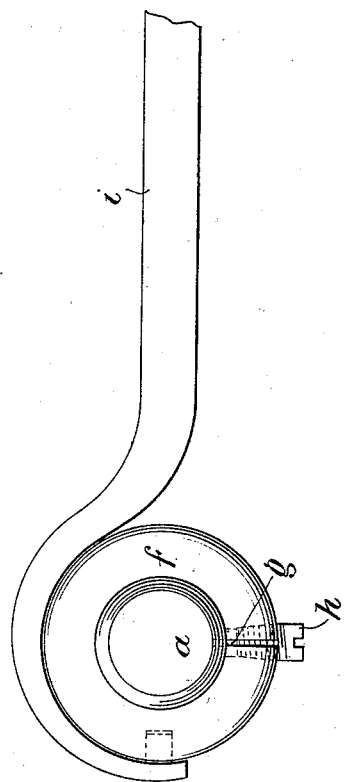
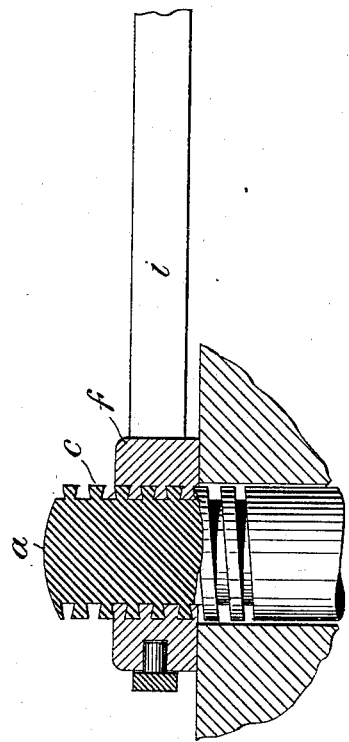
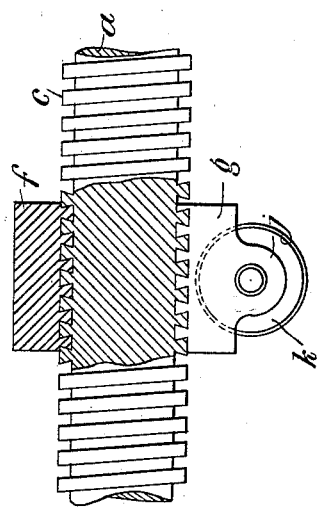
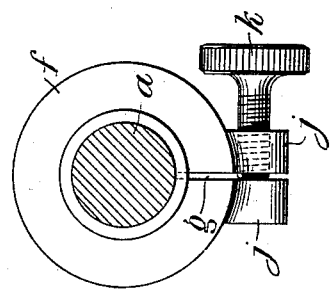
Inventor
W Charles Fischer

UNITED STATES PATENT OFFICE.

WILLIAM CHARLES FISCHER, OF PIMLICO, ENGLAND.

LOCKING DEVICE FOR PARTS OF MACHINERY.

SPECIFICATION forming part of Letters Patent No. 671,274, dated April 2, 1901.

Application filed October 19, 1900. Serial No. 33,560. (No model.)

*To all whom it may concern:*

Be it known that I, WILLIAM CHARLES FISCHER, foreman, of 29 Gillingham street, Pimlico, in the county of London, England, have invented a certain new and useful Locking Device for Parts of Machinery, of which the following is a specification.

The object of this invention is to provide a simple locking device to act as means for securing or attaching together two pieces of metal or other suitable material constituting parts of machinery or for other purposes—as, for instance, a lock-nut for machinery or plant generally.

Figure 3:
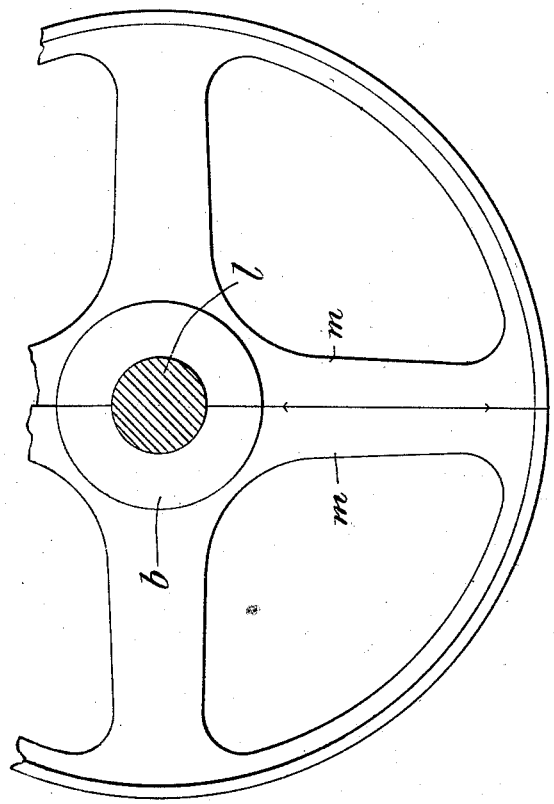
Figure 1:
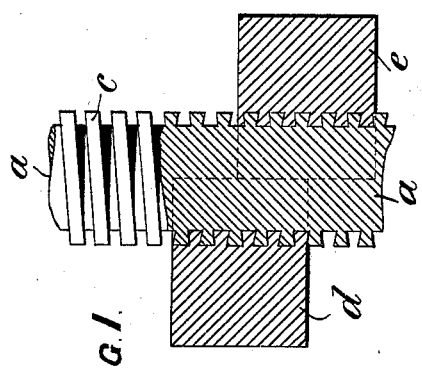
Figure 2:
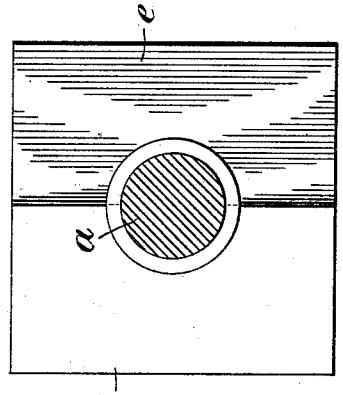

In the accompanying drawings, Figure 1 shows in sectional elevation, and Fig. 2 in plan view, the invention as adapted to connect two pieces of, say, metal in different planes. Fig. 3 is a side view, and Fig. 4 a longitudinal section, showing the invention adapted to a split pulley. Fig. 5 is a plan view, and Fig. 6 a sectional elevation, showing the invention applied to a lock-nut. Fig. 7 is a longitudinal section, and Fig. 8 a plan view, of a slight modification.

The same letters of reference indicate corresponding parts in all the figures.

The invention consists in a dovetail-shaped male and female screw-thread, the male thread being cut either on a solid spindle, pin, or peg or on the outside of a hollow spindle, sleeve, or bush and the female screw in the inner face of a semicircular recess formed in the abutting faces of each of two pieces to be connected together or on the inner side of an annular or other suitably-shaped nut.

Referring then to the figures, $a$ is a solid spindle, pin, or peg, and $b$ is a hollow spindle, sleeve, or bush.

$c$ is the thread, which may be of any pitch, but is of dovetail shape in cross-section.

In Figs. 1 and 2, $d$ and $e$ represent two pieces of metal or other material which it is desired to connect together. Each of the pieces $d$ and $e$ is formed with a female half-thread, and the pieces $d$ and $e$ may be placed together in the same or in different planes, as indicated in the drawings, to receive the spindle, pin, or peg $a$, the dovetail thread $c$ of which will draw the pieces $d$ and $e$ together and securely hold them without any additional fastening under ordinary circumstances.

Under certain conditions—as, for instance, where the strain is likely to be considerable—I may employ as an additional precaution a lock-nut. (See Figs. 5 and 6.) This lock-nut consists of a dovetailed tapped annular or other suitably-shaped nut $f$, which is radially split at $g$. When this nut is screwed home and has a solid bearing, it expands and the dovetail male thread jams in the dovetail female thread on the whole length of the engaged threads and produces a perfect lock-nut. To prevent any risk of its moving, I bore a taper hole radially of the nut where it is split, tap it with an ordinary thread, and insert therein a threaded taper plug $h$, as shown.

$i$ represents a kind of spanner.

Lugs $j$ may be attached to the nut, one on either side of the radial split $g$, one lug being tapped to receive a thumb-screw $k$ (see Figs. 7 and 8) in place of the taper plug.

Figure 4:
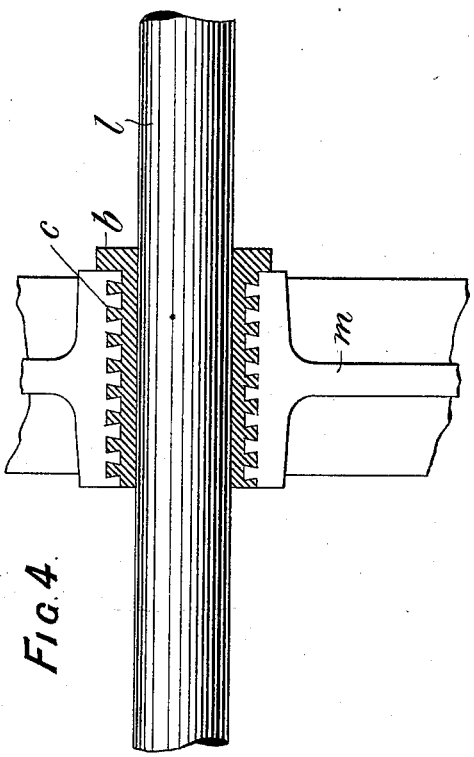

To produce a pulley from two halves, the hollow spindle, sleeve, or bush, threaded externally with the dovetail thread, is mounted on the shaft $l$, as shown in Figs. 3 and 4. The two halves $m$ $m$ of the pulley, which have been prepared as indicated with reference to Figs. 1 and 2, are brought together and screwed onto the hollow spindle, sleeve, or bush $b$, which will thus hold the two parts securely together. In this way a cheap split pulley may be produced which can be easily taken apart when desired, but which while engaged will be perfectly rigid. For an additional precaution the lock-nut above referred to may also be employed.

I would here remark that I do not intend to confine myself to the applications herein described, which are given merely by way of example, the essential feature of the invention being the dovetail-shaped male and female screw-thread, which is applicable for many purposes in the arts.

What I claim is—

A locking device for parts of machinery, consisting of a male and female dovetail-shaped screw-thread on the several parts, combined and operating as herein shown and described.

W. CHARLES FISCHER.

Witnesses:
ALFRED S. BISHOP,
L. U. REDDIE.